Sept. 20, 1971  F. P. BEUCHLE ET AL  3,606,488
ANTISKID BRAKE SYSTEM FOR VEHICLES Filed Jan. 15, 1970  2 Sheets-Sheet 1

Inventors
F. P. Beuchle
O. Depenheuer
By
Agent

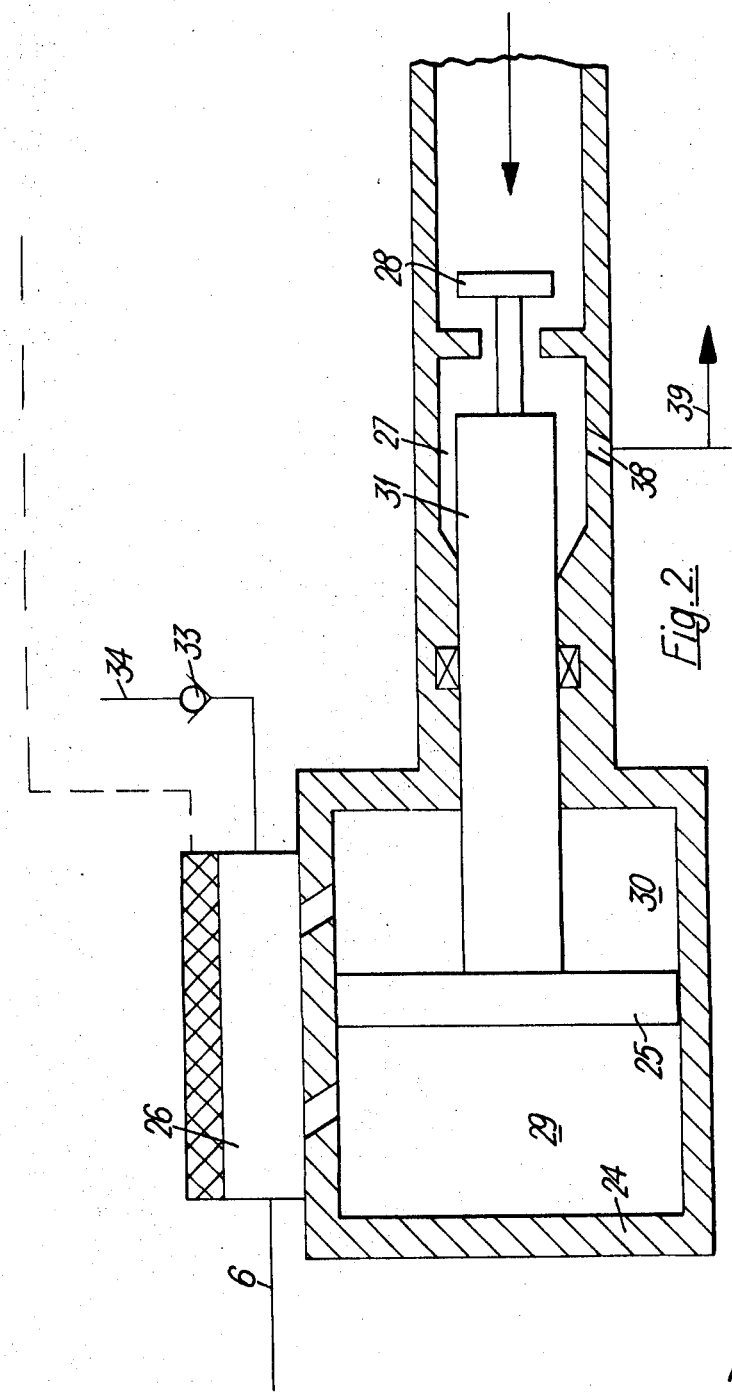

United States Patent Office 3,606,488
Patented Sept. 20, 1971

3,606,488
ANTISKID BRAKE SYSTEM FOR VEHICLES
Friedrich Paul Beuchle, Frankfurt am Main, and Otto Depenheuer, Bad Homburg, Germany, assignors to International Telephone and Telegraph Corporation, New York, N.Y.
Filed Jan. 15, 1970, Ser. No. 3,119
Claims priority, application Germany, Jan. 17, 1969, P 19 02 186.4
Int. Cl. B60t 8/12, 13/14
U.S. Cl. 303—21F                                        5 Claims

ABSTRACT OF THE DISCLOSURE

An antiskid control for a pump powered hydraulic brake including a valve in each brake line for cutting off brake pressure and releasing the pressure in response to a wheel deceleration threshold signal. Each valve is movable by a hydraulic actuator having a movable partition forming two chambers. The brake booster may be connected to either chamber to open or close the valve depending on the deceleration signal.

BACKGROUND OF THE INVENTION

Field of the invention

This invention relates to an antiskid system for a pump powered hydraulic vehicle brake system.

Description of prior art

An antiskid vehicle brake system is known in which a vacuum cylinder is divided by a rolling membrane into two parts. On the membrane disc a recuperator piston, particularly a plunger, is arranged which plunges into the recuperator piston cylinder which is sealed against the vacuum piston and in rest position keeps an inlet valve open so that the wheel cylinder communicates hydraulically with the master cylinder. One chamber of the vacuum cylinder is constantly connected with the vacuum of the engine while the other one enclosing the recuperator piston cylinder communicates either with the vacuum of the engine or the atmosphere by a 3/2-valve which is operated electromagnetically. In rest position the recuperator piston is held by a spring propped between the bottom of the vacuum cylinder and the partition. Both chambers communicate with the vacuum of the engine in rest position.

When the sensor records a rotary deceleration of the wheel which is too high the electronics that follow the sensor give off a voltage or current signal to excite the electromagnetic valve thus connecting to the outside air the chamber of the vacuum cylinder into which the recuperator piston projects. The increased pressure in this chamber forces the elastically deformable partition and the recuperator piston to move against the force of the spring so that the inlet valve is closed and the volume between the inlet valve and the wheel cylinder increased thus reducing the pressure at the wheel cylinder. When the electromagnetic valve returns into its initial position, both chambers of the vacuum cylinder are again connected with the vacuum of the engine and the force of the spring gradually returns the recuperator piston to its initial position, thus opening the inlet valve. The control system, which comprises the described arrangement as control unit, is provided separately for one or two axles, the two wheels of an axle being controlled jointly. In a two-circuit brake system, however, it is desirable to provide a separate control unit for each wheel. Due to lack of space, this bulky prior art device, which relies on engine vacuum as a drive force, cannot be utilized when a separate control is needed for each wheel.

SUMMARY OF THE INVENTION

An object of the invention is to provide recuperator piston units for two-circuit brake systems which are moved by a controlled pressure difference, need little space and can be provided separately for each wheel.

This invention achieves these objects by connecting the pressure head of a brake booster or a pressure accumulator to one or the other chamber on either side of a recuperator piston dependently on the output signal of a deceleration sensor.

A control unit is installed for each wheel comprising a rotary deceleration sensor and a recuperator piston unit arranged in the brake line of the wheel cylinder and controlled by pressure, the cylinders of the recuperator pistons being hydraulically connected in parallel to the master cylinder.

In a preferred embodiment of the two-circuit brake system the cylinders of the recuperator piston are connected parallelly in pairs with each chamber of the twin-cylinder through hydraulic lines.

Due to an electromagnetic valve which is actuated in response to the rotary deceleration the chambers of the cylinder which are formed by the partition, and whose pressure difference operates the recuperator piston, communicate alternately with the hydraulic line of the booster and through a return valve with the storage tank. In a different embodiment the two chambers of the divided cylinder can communicate through a valve alternately with the pressure accumulator and the storage tank.

BRIEF DESCRIPTION OF THE DRAWINGS

FIG. 2 shows a sectional view through one of the recuperator pistons shown in FIG. 1.

DESCRIPTION OF THE PREFERRED EMBODIMENT

Figure 1:
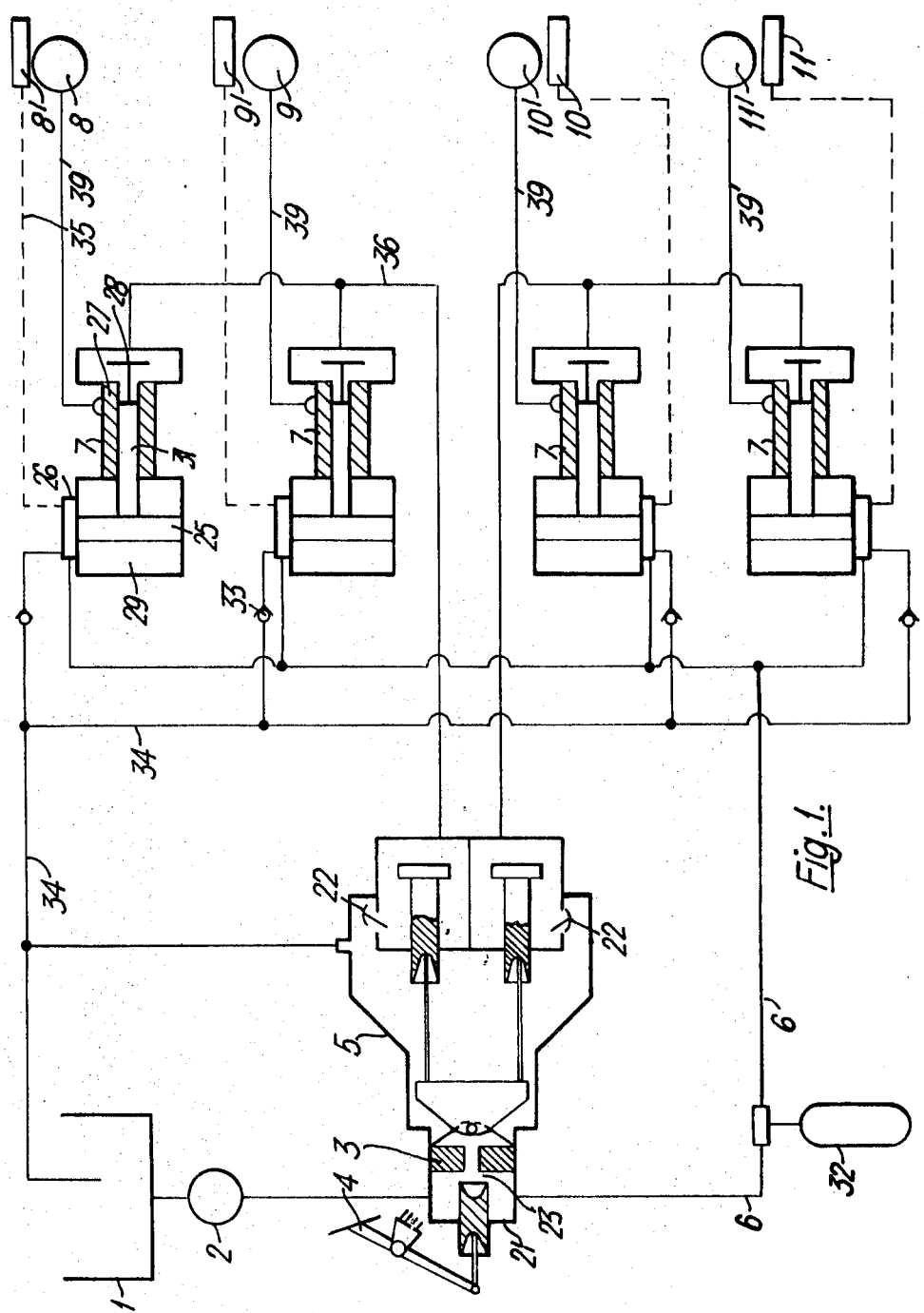
FIG. 1 is a schematic representation of a two-circuit brake system embodying the present invention.

As illustrated in FIG. 1 the storage tank 1 which receives the displaced pressure medium is directly connected with the twin-cylinder 5 and with the hydraulic booster 21 via a pump 2. The booster 21 multiplies the pedal effort exerted on the pedal 4 and transmits it to the twin-cylinder 5. In addition, the booster provides a hydraulic line 6 to the solenoid valves of each of the four recuperator piston units 7. In the line 6 a pressure accumulator 32 can be arranged. A hydraulic line 36, 36′ leads from each of the two chambers of the twin-cylinder to two cylinders of the recuperator pistons which are associated with the wheels of the front axle and the rear axle respectively and are in their turn hydraulically connected with the wheel cylinder 8, 9, 10, 11. Each wheel has a sensor 8′, 9′, 10′, 11′ and following electronics which give off a current signal to the respective electromagnetic valve to control the brake pressure when a deceleration has reached a predetermined maximum value.

The piston 3 of the booster 21 acts upon the parallelly guided pistons of the twin-cylinder 5 from which separate brake circuits for the front and rear axle branch off. The operation of the booster piston is assisted by the hydraulic pressure of the pump circulation. A throttle 23 in the booster 21 admits the circulation of the pressure medium through the storage tank 1 and the pump 2 when no braking action takes place. By throttling, a pressure is accumulated in the booster 21 which intensifies the brake pressure and acts upon each chamber of the twin-cylinders and reaches the two parallelly connected hydraulic recuperator piston units of a wheel axle through the valve 28. The pressure is transmitted to the wheel cylinders via bore 38 and line 39. The tilting valves 22 connect the pressure chambers of the twin-cylinder with the storage tank when the brake is released.

FIG. 2 shows one of the recuperator piston units, all of which are identical. A cylinder 24 is divided into two parts by a movable partition 25, such as a rolling membrane or a piston. The two chambers 29 and 30 resulting therefrom are sealed from each other and each can be alternately connected by an electromagnetic 3/2-valve 26 with the booster 3 or an interposed pressure accumulator 32 via the hydraulic line 6. When one chamber is connected to the line 6, the other is simultaneously connected to the storage tank via check valve 33 and return line 34.

The recuperator piston 31, which is fixed to the partition 25 carries the movable valve 28 which is spring loaded toward the open position so that the valve follows the motion of the piston until the valve is closed.

Before a braking action starts the pressure medium circulates between the storage tank 1, the pump 2 and the booster 21. Moreover, the electromagnetic valve 26 connects the chamber 29 of the cylinder 24 through the booster 21 with the pump 2 so that the pressure head on the partition 25 sets the recuperator piston in initial position and keeps the valve 28 open. When a pressure accumulator 32 is arranged in the line 6, a relatively high pressure, independent of the brake pressure, can be expected for the control. Upon a normal braking action the throttling valve 23 in the booster 21 is more or less closed. By throttling the pump circulation, a pressure is accumulated with acts upon the twin-cylinders thus affecting the wheel cylinder by intensified pressure through the valve 28 and the cylinder 27 and resulting in a deceleration of the vehicle. If the deceleration exceeds a predetermined threshold value, the sensor of the respective wheel gives off a current signal which excites the electromagnetic valve 26 so that the connection of the chamber 29 with the pump is interrupted and the line 6 is connected to the chamber 30. Now, the brake pressure and the pressure of the pressure medium conveyed by the pump 2 into chamber 30 act in the same direction upon the movable partition 25 so that the recuperator piston 31 is moved and pressure medium can flow from the chamber 29 closing valve 28 so that the supply of pressure medium from the twin-cylinder is interrupted. Simultaneously the volume in the brake circuit between the valve 28 and the wheel cylinder is increased by the motion of the partition 25 and the recuperator piston 31 so that the pressure of the pressure medium is reduced and the wheel can be accelerated again. When the exciting current of the solenoid valve breaks away, the valve returns into its initial position and the pressure which is conducted by the pump 2 through the line into the chamber 29 opens the valve 28 via the recuperator piston 31. A new braking action may start. A return line 34 simultaneously connects the chamber 30 with the storage tank 1.

In another preferred embodiment the electromagnetic valve 26 can be a simple opening valve which connects or disconnects only chamber 30 with the line 6 while the movable partition 25 and the recuperator piston 31 is returned by a pressure spring arranged in chamber 29. From chamber 30 a return leads to the storage tank.

A particular advantage of this invention is that all wheels of the vehicle can be controlled separately. Due to the strength of the hydraulic pressure head the recuperator piston units can be kept so small that they all can be placed in a unit attached to the twin-cylinder.

It will be appreciated that the invention illustrated and described herein may be modified by those skilled in the art without deviating from the spirit and scope of the invention as set forth in the following claims.

We claim as our invention:

1. In a pump powered hydraulic vehicle brake system having an actuator cylinder hydraulically connected to a pressure operated wheel brake, a pump supplying pressure medium to a booster for multiplying the brake force applied to the actuator cylinder and a storage reservoir connected to said pump, an antiskid system comprising: a valve in the brake pressure line movable between an open position in which pressure may be applied to the wheel brake and a closed position in which the pressure is cut off and the brake pressure released, a first and second pressure chambers separated by a movable partition connected to the valve whereby enlargement of the first chamber moves the partition in a direction to open the valve and enlargement of the second chamber moves the partition in a direction to close the valve, means for connecting the booster to the first chamber and the storage reservoir to the second chamber to hold the valve open, and means for connecting the booster to the second chamber and the storage reservoir to the first chamber in response to a signal indicating an incipient locking of the wheel whereby the valve will close and reduce the brake pressure.

2. The brake system of claim 1 including a plurality of parallelly connected wheel brakes each having a separate deceleration sensor, valve and pressure chambers for controlling the brake pressure independently, the means for connecting the pressure chambers to the booster and storage reservoir being parallel hydraulic lines.

3. The brake system of claim 1 wherein there are two brake circuits, each including a pair of parallelly connected wheel brakes and separate deceleration sensors, valves and pressure chambers for each wheel brake, the means for connecting the pressure chambers to the booster and storage reservoir being parallel hydraulic lines.

4. The brake system of claim 1 wherein the means for connecting the booster and storage reservoir to the pressure chambers is an electromagnetically operated valve operable in response to rotary wheel deceleration signals.

5. The brake system of claim 1 including a pressure accumulator between the booster and the pressure chambers which can be alternately connected to either pressure chamber.

References Cited
UNITED STATES PATENTS

| | | | |
|---|---|---|---|
| 3,286,734 | 11/1966 | Hartshorne | 303—21FX |
| 3,312,509 | 4/1967 | Highley | 303—21FUX |
| 3,401,982 | 9/1968 | Walker et al. | 303—21CGUX |
| 3,497,269 | 2/1970 | Van Wicklin | 303—21F |
| 3,524,683 | 8/1970 | Stelzer | 303—21F |

MILTON BUCHLER, Primary Examiner

J. J. McLAUGHLIN, Assistant Examiner

U.S. Cl. X.R.

303—6R, 10, 61; 188—181A